(12) United States Patent
Henderson et al.

(10) Patent No.: US 12,514,406 B2
(45) Date of Patent: Jan. 6, 2026

(54) BULK FOOD DISPENSER WITH ENVIRONMENTAL CONTROL

(71) Applicant: Frito-Lay North America, Inc., Plano, TX (US)

(72) Inventors: Eric T. Henderson, Chicago, IL (US); Carl Littrell, Plano, TX (US); Alistair Bramley, Manhattan, NY (US); Nicolas Donadio, Plano, TX (US); Emanuele Teobaldo, Brooklyn, NY (US); Luis Rene Gutierrez Quintanilla, Azcapotzalco (MX); David Rodrigo Lopez Soto, Azcapotzalco (MX)

(73) Assignee: Frito-Lay North America, Inc., Plano, TX (US)

( * ) Notice: Subject to any disclaimer, the term of this patent is extended or adjusted under 35 U.S.C. 154(b) by 219 days.

(21) Appl. No.: 18/239,547

(22) Filed: Aug. 29, 2023

(65) Prior Publication Data

US 2024/0108179 A1 Apr. 4, 2024

Related U.S. Application Data (60) Provisional application No. 63/377,629, filed on Sep. 29, 2022.

(51) Int. Cl.
  *A47J 47/01* (2006.01)
  *A47F 1/03* (2006.01)
  (Continued)

(52) U.S. Cl.
  CPC .............. *A47J 47/01* (2013.01); *A47F 1/03* (2013.01); *A47J 47/02* (2013.01); *B01D 53/261* (2013.01)

(58) Field of Classification Search
  CPC ........ A47J 47/01; A47J 47/04; A47J 47/4702; A47F 1/03; A47F 1/02; B01D 53/261; B01D 53/26; B65D 83/06
  (Continued)

(56) References Cited

U.S. PATENT DOCUMENTS

| 3,400,861 | A |   | 9/1968  | Pearl |         |
|-----------|---|---|---------|--------|---------|
| 4,360,129 | A | * | 11/1982 | Brokaw | A47J 31/50 |
|           |   |   |         |        | 366/139 |

(Continued)

FOREIGN PATENT DOCUMENTS

| EP | 3542678 | 9/2019 |
| EP | 3669707 | 6/2020 |

OTHER PUBLICATIONS

International Preliminary Report on Patentability issued on Mar. 1, 2025, in PCT/US2023/031413.

(Continued)

*Primary Examiner* — David J Walczak
(74) *Attorney, Agent, or Firm* — Barnes & Thornburg LLP; G. Peter Nichols (57) ABSTRACT

A dispenser for stored product such as food products includes a generally hollow housing having a cavity configured to retain product; an outlet provided at a lower portion of the housing with a proximal portion adjacent the cavity and a distal portion spaced from the proximal portion; a gate disposed between the cavity and the distal portion or disposed at the distal portion; an actuator coupled to the gate to selectively position the gate between a closed position and an open position, wherein in the closed position product disposed within the cavity cannot move to the outlet and in the open position product falls by gravity from the cavity to the outlet; and optionally an environmental control unit to control an environmental control apparatus to modulate at least one of temperature, moisture content, or oxygen con- (Continued)

tent within the dispenser or an agitator assisting movement of the product to the outlet.

7 Claims, 12 Drawing Sheets

(51) Int. Cl.
    *A47J 47/02*     (2006.01)
    *B01D 53/26*     (2006.01)

(58) Field of Classification Search
    USPC ........... 222/544, 547, 146.1, 152, 185.1, 53, 222/181.1

See application file for complete search history.

(56) References Cited

U.S. PATENT DOCUMENTS

| | | | |
|---|---|---|---|
| 5,437,393 A * | 8/1995 | Blicher | G01F 11/24 |
| | | | 141/369 |
| 6,182,864 B1 | 2/2001 | Elmore | |
| 6,883,686 B2 | 4/2005 | Langlois et al. | |
| 7,178,697 B2 | 2/2007 | Brundick et al. | |
| 9,611,108 B1 | 4/2017 | Johnson et al. | |
| 2006/0186138 A1 | 8/2006 | Brundick | |
| 2011/0062187 A1 | 3/2011 | Johnson et al. | |
| 2011/0062190 A1 | 3/2011 | Johnson et al. | |
| 2016/0207692 A1 | 7/2016 | Martinez | |
| 2020/0189836 A1 | 6/2020 | Sunesson et al. | |

OTHER PUBLICATIONS

International Search Report and Written Opinion issued on Dec. 13, 2023 in PCT/US2023/031413.

* cited by examiner

BULK FOOD DISPENSER WITH ENVIRONMENTAL CONTROL

This application claims priority to U.S. Application No. 63/377,629 filed Sep. 29, 2022, the entire contents of which are incorporated herein by reference.

This disclosure relates to a dispensing apparatus and, more particularly, to a gravity feed food dispenser that includes environmental control to ameliorate the ingress of oxygen and/or moisture into the dispenser. The apparatus allows food that is present in the apparatus to flow under gravity to an outlet from which the product is dispensed.

BACKGROUND

Gravity fed bins for dispensing bulk materials are used to dispense a wide variety of materials having a range of sizes and aggregate make-ups as diverse as hardware components, e.g., nuts and bolts, to food, e.g., pastas, cereals, nuts, coffee (either beans or ground), dried soup mixes, candies, spices, and the like. Generally, the bins have an upper enclosed portion suitable to contain the product and to prevent handling or touching by the consumer with an outlet or chute at its lower end utilized to dispense the product.

Depending on the product to be dispensed, gravity fed dispensing apparatuses are not suited for all types of products because they do not readily fall toward and through the outlet.

In addition, when the product to be dispensed is a food product, there is a desire to maintain the freshness of the food product. In this regard, it is known that oxygen and moisture may have a negative effect on food products causing oxidation of fats and staleness of the food product. Accordingly, there is a need to provide environmental control systems for the dispensing apparatuses to combat the negative effects of oxygen and moisture.

The following description will describing the dispensing apparatus in terms of dispensing a food product and thus mention of a dispensing apparatus will refer to a food product dispensing apparatus unless specifically noted otherwise.

SUMMARY

One aspect of the described bulk food dispensing apparatus (the dispensing apparatus or dispenser) includes a housing defining a cavity, an opening having a proximal portion adjacent the cavity and a distal portion spaced from the proximal portion that defines an outlet, from which product is dispensed, usually into a consumer supplied receptacle. A gate is associated with the opening and is configured to be actuated between a closed position and an open position such that in the open position, food product within the cavity moves through the opening.

In some instances, more than one gate may be provided. In this instance, there may be an interior gate located at or near the proximal portion of the opening and may be an exterior gate located at or near the distal portion of the opening and spaced from the interior gate. The exterior gate is configured to be actuated between a closed position and an open position such that in the open position, food product disposed between the interior gate and the exterior gate will pass through the outlet and into a provided receptacle for containing the food product.

The dispensing apparatus may be provided with an agitator such that when the agitator is activated it assists the food product to move from the cavity toward and through the opening. In some instances, the agitator may be in contact with the food product (directly or indirectly), and/or may be associated with each or all the gates such that when the gate is or the gates are in an open position, the agitator is activated and operates to assist the food product to move from the cavity toward and through the opening.

Other aspects of the described bulk food dispensing apparatus may include an environmental control apparatus that may include one or more of an oxygen or moisture displacement apparatus (may be referred to as the displacement apparatus). The oxygen displacement apparatus may include a vacuum operably connected to the dispensing apparatus and effective to remove all or substantially all of the air (oxygen) present in the apparatus. Alternatively or additionally, the oxygen displacement apparatus may include a system for delivering an air (oxygen) displacement substance (typically an inert gas) to the dispensing apparatus to displace the ambient air (containing oxygen) in the apparatus, thereby lessening oxidation of the stored food product. It will be appreciated by the skilled artisan that oxygen displacement apparatus will also be effective at removing moisture from the dispensing apparatus.

Alternatively or additionally, the moisture displacement apparatus may include a chamber separated from the cavity but in fluid communication with the fluid cavity so that air in the cavity may pass in and out of the chamber. The chamber may be provided with a moisture absorbing material such as silica to remove and absorb moisture that may be present in the cavity. The chamber is provided with a sealable opening to facilitate insertion and removal of the moisture absorbing material.

The described bulk food dispensing apparatus can be part of a bulk food dispensing module in which one or more individual bulk food dispensing apparatuses are provided, each dispensing apparatus may or may not contain a different type of food product.

Other aspects and advantages of this invention will be appreciated from the following detailed description.

DETAILED DESCRIPTION

Figure 1:
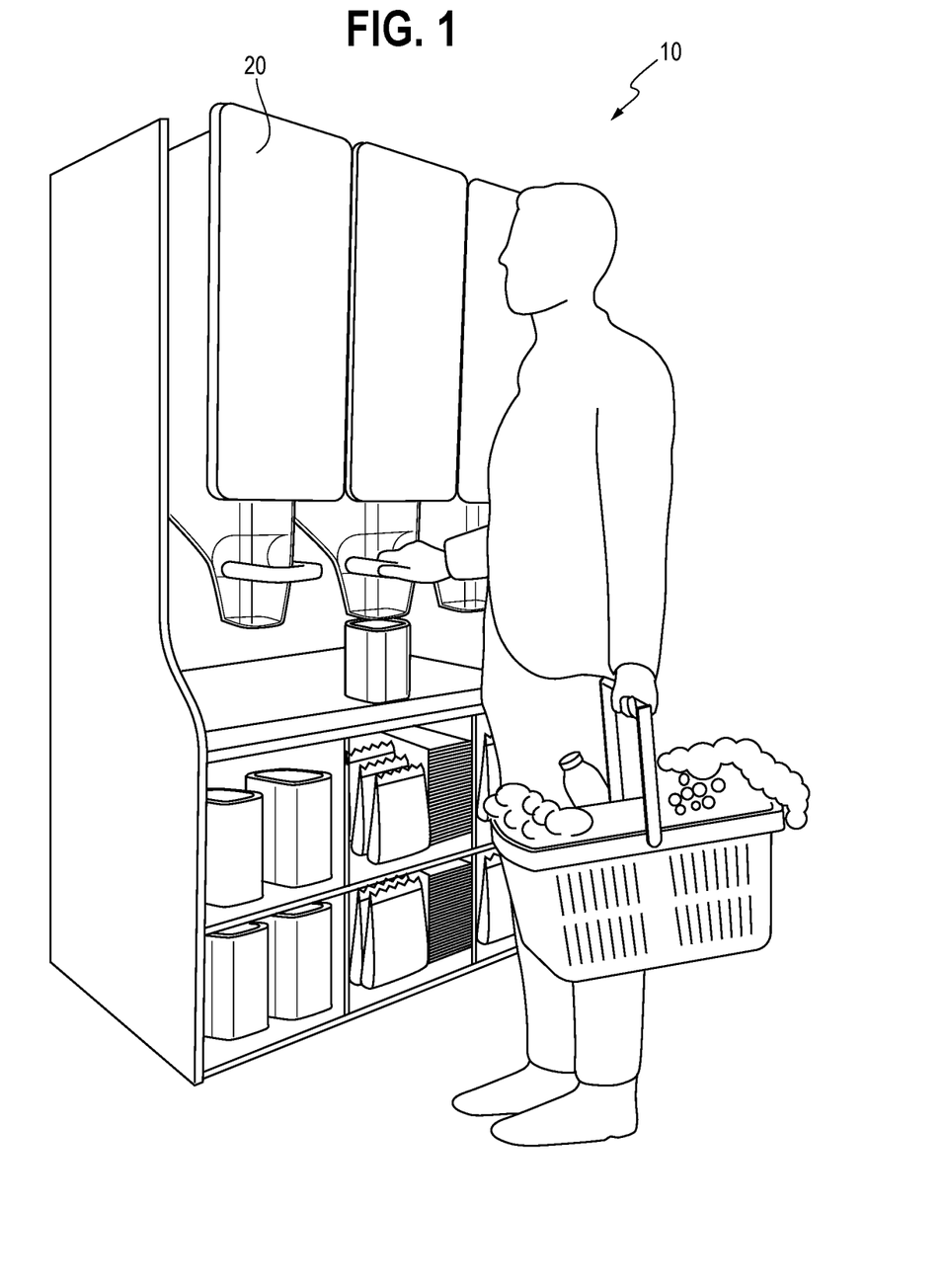
FIG. 1 is a schematic representation of a bulk food dispensing module in which one or more individual bulk food dispensers are provided.

Turning to FIG. 1, a bulk food dispensing module 10 is depicted. The module removably receives one or more individual bulk food dispensing apparatuses 20, in which each dispensing apparatus may or may not contain a different type of food product.

Figure 2A:
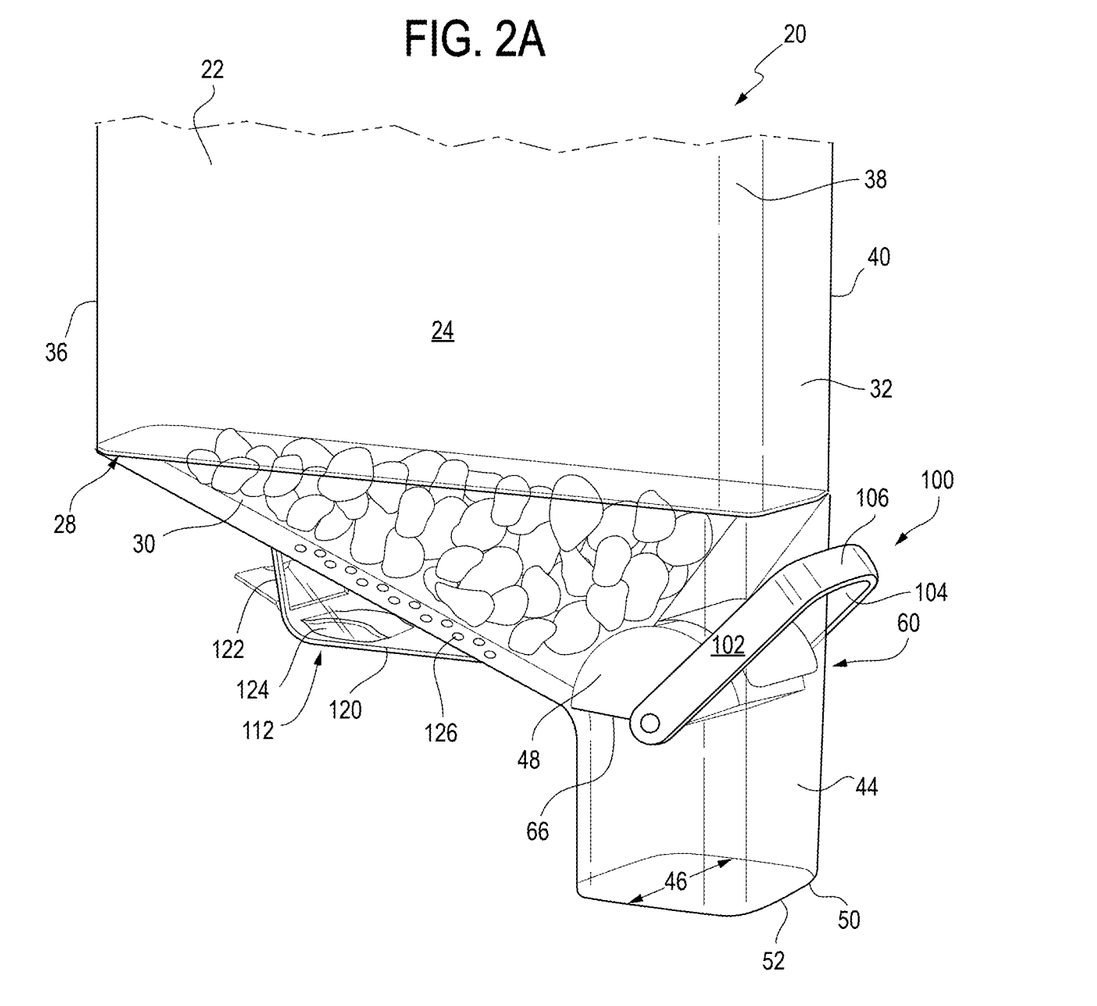
FIG. 2A is one embodiment of a food dispensing apparatus with the gate in a closed position and with the environmental control apparatus in the form of a moisture mitigation apparatus.

Referring to FIG. 2A, one embodiment of a portion of a bulk food dispensing apparatus (the dispensing apparatus or dispenser) 20 is shown. The dispensing apparatus 20 includes a housing 22 that defines a cavity 24 in which the food product is stored for dispensing. The housing 22 includes a top 26 (shown in FIG. 7), a bottom 28, with a funnel-like lower portion 30, a front 32, rear 36, first side 38 and second side 40, such that the interior portion of each defines the cavity 24. At least one of the top 26, bottom 28, front 32, rear 36, first side 38, or second side 40 is configured to be removable to provide access to the cavity 24 so that the cavity 24 can be cleaned and food product can be loaded into the cavity 24 for dispensing through an outlet 52.

As noted, in some aspects, the bottom 28 of the housing includes a funnel-like lower portion 30 at a lower end of the cavity 24 which serves to accumulate product by gravity. As shown in FIG. 2, in this instance, the bottom 28 slopes downwardly from the rear 36 to the front 32 of the housing 22 so that the food product is encouraged by gravity to move toward an opening 44. The opening 44 may have any suitable shape that allows product within the cavity to move through the opening 44 to the outlet 52. Thus, for example, the opening 44 may have a rectilinear shape such with side walls that are contiguous with the side walls of the housing, which may then define an inner width 46 of the opening 44 from the first side wall 38 to the second side wall 40. Alternatively, the opening 44 may be rounded or may be circular or oval in cross-section.

The cavity 24 may be selectively sealed from communication with the opening 44 or the outlet 52 by a gate 60 and, as shown in FIG. 2A, the gate 60 is a selectively moveable interior gate 62. In one embodiment, the proximal portion 48 of the opening 44 is provided with a first sealing member 54 opposite a second sealing member 56 (see FIG. 3A). The first 54 and second sealing 56 members cooperate with the gate 60 to prevent product in the cavity 24 from moving from the cavity 24 through the opening 44 or the outlet 52. One or both of the sealing members may be formed of a flexible material to enhance the sealing.

Figure 2B:
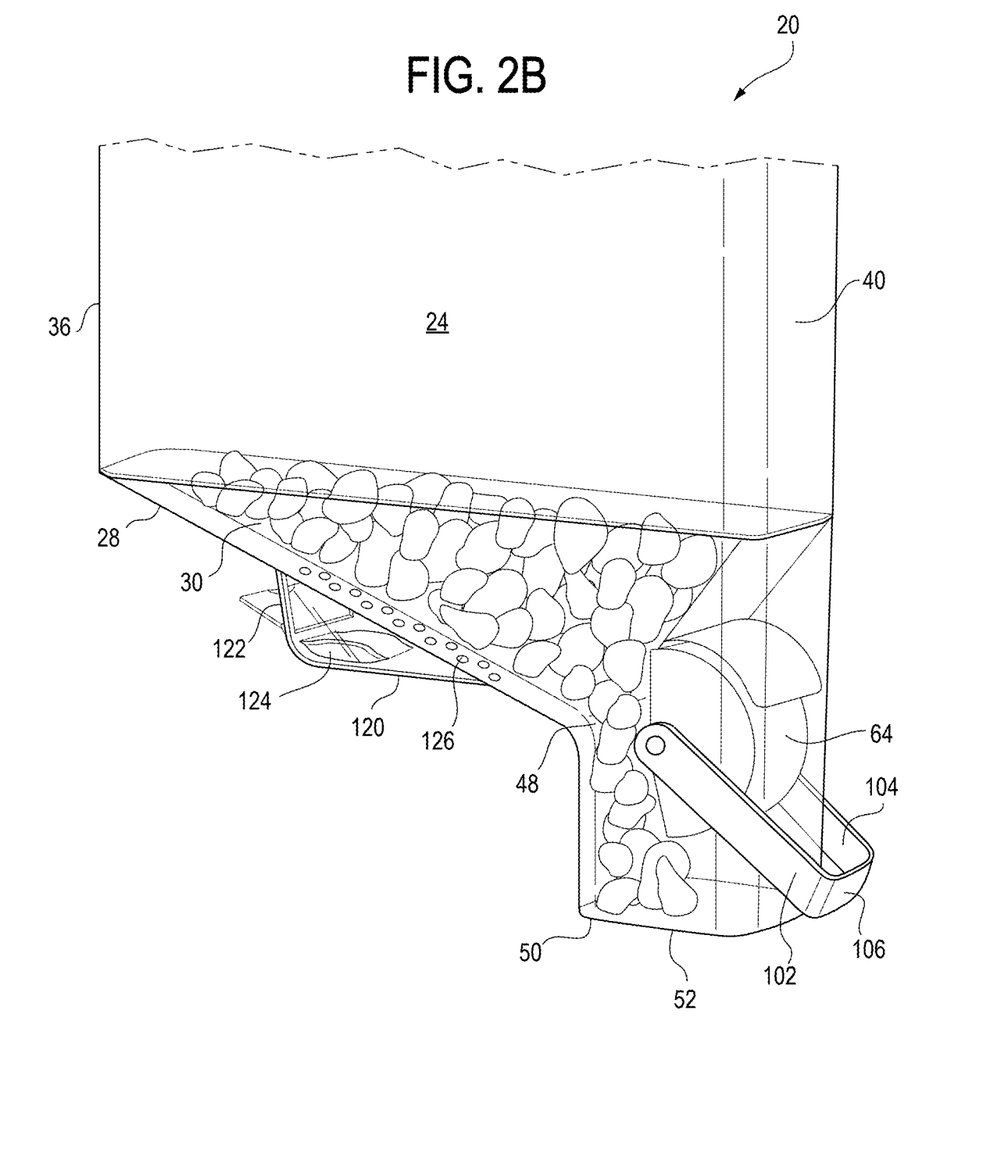
FIG. 2B shows the food dispensing apparatus of FIG. 2A with the gate open to illustrate the movement of food from the cavity of the housing toward the opening to be dispensed into a receiving receptacle (not shown).

In the embodiment shown in FIGS. 2A and 2B, the interior gate 62 is associated with the proximal portion 48 of the opening 44 and is spaced from a distal portion 50 of the opening 44. The interior gate 62 as shown in FIG. 2A is shown in a closed positon. FIG. 2B shows the dispensing apparatus 20 of FIG. 2A, but with the interior gate 62 in an open position. Thus, it will be appreciated that the gate 60 is configured to be actuated between a closed position and an open position such that in the open position, food product within the cavity 24 is dispensed through the opening 44 and the outlet 52.

The interior gate 62 in this instance is provided as a solid generally semi-circle that has a width that approximates the inner width 46 of the opening 44 and, in some instances abuts the interior of each side wall 36, 38 of the opening so that ingress of air into the cavity 24 is inhibited and unintentional egress of the food product from the cavity 24 is inhibited. The gate 60 may be made of any suitable material but in some instances it may be useful if the gate is made a somewhat resilient material so that it conforms to the interior side walls 36, 38 of the opening 44 yet is capable of movement within the opening 44.

When the interior gate 62 is in a closed position, as shown in FIG. 2A, a rounded portion 64 of the interior gate 62 may be in contact with the first and second sealing members with the substantially flat portion 66 being normal to the front wall 32 of the opening 44. It is also evident that the generally flat side 66 of the interior gate 62 is generally parallel to the front wall 32 when the interior gate 62 is in an open position, as shown in FIG. 2B.

As shown in FIGS. 2A and 2B, a gate actuator 100 is provided to move the gate 60. In this embodiment, the gate actuator 100 is in the form of a u-shaped handle with one end having two legs 102, 104, each connected to the gate 60 and the other end, which is a closed end 106, extends outwardly from and beyond the front 32 of the dispensing apparatus 20 so that it can be grasped by the user. As shown in FIG. 2A, the gate actuator 100 is in a first positon and, in this instance, the interior gate 62 is in a closed position. In a second position, shown in FIG. 2B, the gate actuator 100 is in a second position and, in this instance, the interior gate 62 is in an open position.

It will be appreciated that the gate actuator 100 may take any suitable form so long as the gate 60 may be selectively moved from a closed position to an open position or any position between the closed position and the open position. To that end, movement of the gate actuator 100 to a selected position between the first position and the second position will control the flow and thus the amount of the food product moving from the cavity 24 through the outlet 52. In this regard, and referring specifically to FIGS. 2A and 2B, it will be appreciated that when the gate actuator 100 is moved slightly from the first position only a small amount of the opening 44 is exposed and thus, the flow of product to the proximal portion 48 of the opening 44 is less as compared to a situation where the gate actuator 100 approaches the second position so that a larger amount of the opening 44 is exposed and thus, the flow and amount of product to the proximal portion 48 of the opening 44 is greater.

Generally, one or more biasing members (not shown) are interactively coupled with the gate actuator 100 to bias the gate actuator 100 to the first position so that the gate 60 is biasingly retained in a closed position until the gate actuator 100 is moved toward the second position, i.e., toward the position shown in FIG. 2B. After a desired amount of food product is dispensed, typically to a receptacle (not shown) the gate actuator 100 may be released and the one or more biasing members biasingly operate to return the gate actuator 100 to the first position and thus, the interior gate 62 to the closed position to prevent more food product from being dispensed.

The dispensing apparatus 20 may be provided with an environmental control apparatus 112 that may include one or more of an oxygen and/or moisture displacement apparatus (may be referred to as the displacement apparatus). Examples of an oxygen displacement apparatus 114 include a vacuum operably connected to the dispensing apparatus and effective to remove all or substantially all of the air (oxygen) present in the apparatus. Alternatively or additionally, the oxygen displacement apparatus 114 may include a system for delivering an air (oxygen) displacement substance (typically an inert gas) to the dispensing apparatus to displace the ambient air (containing oxygen) in the apparatus, thereby lessening oxidation of the stored food product.

Referring to 2A or 2B, an environmental control apparatus 112 is depicted in the form of one embodiment of a moisture displacement apparatus 116. In this embodiment, a chamber 120 is provided and is separated from the cavity 24 but in fluid communication with the cavity 24 by providing holes 126 in the housing 22 such that the hoes 126 are surrounded by the chamber 120 so that air in the cavity 24 may pass into and out of the chamber. While FIGS. 2A and 2B only show a single chamber 120, it is contemplated that more than one chamber 120 may be provided.

The chamber 120 may be provided with an inert substance 124 adapted to absorb moisture such as silica or other suitable material to remove and absorb moisture that may be present in the housing 22. The chamber 120 is provided with a sealable opening 122 to facilitate insertion and removal of the inert moisture absorbing material 124.

Figure 3A:
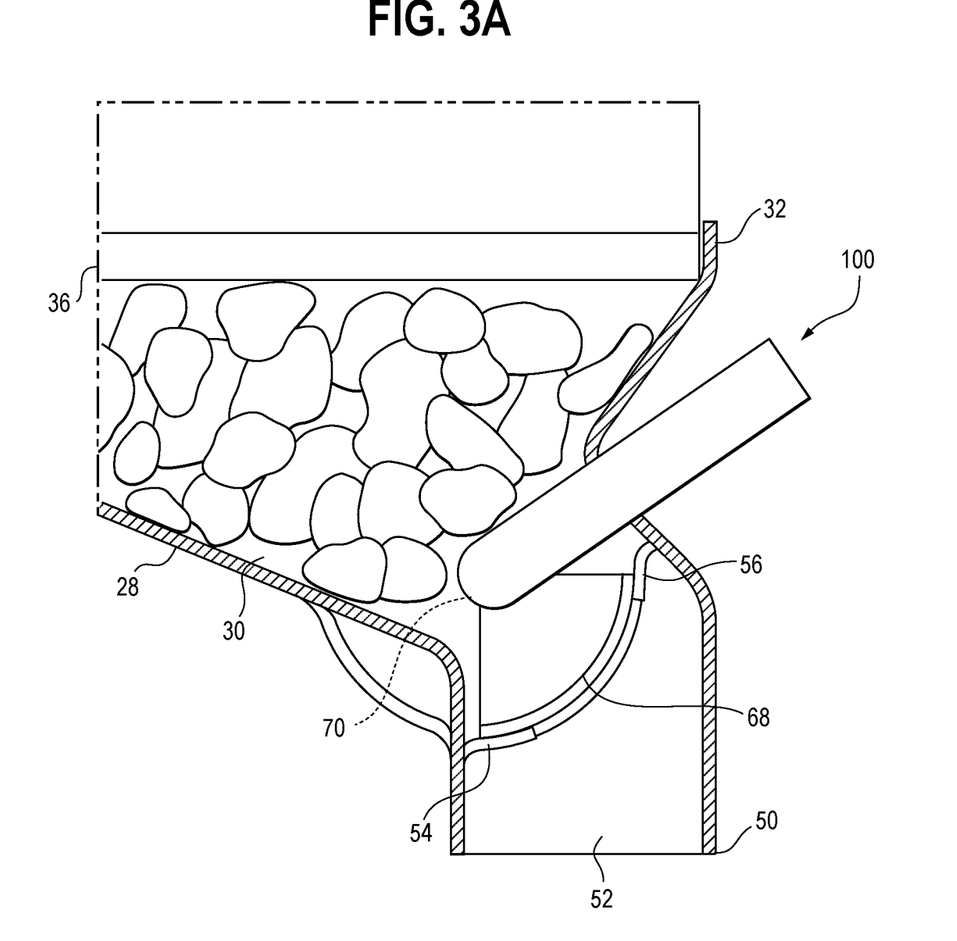
FIG. 3A shows another embodiment of a food dispensing apparatus with the gate in a closed position.
Figure 3B:
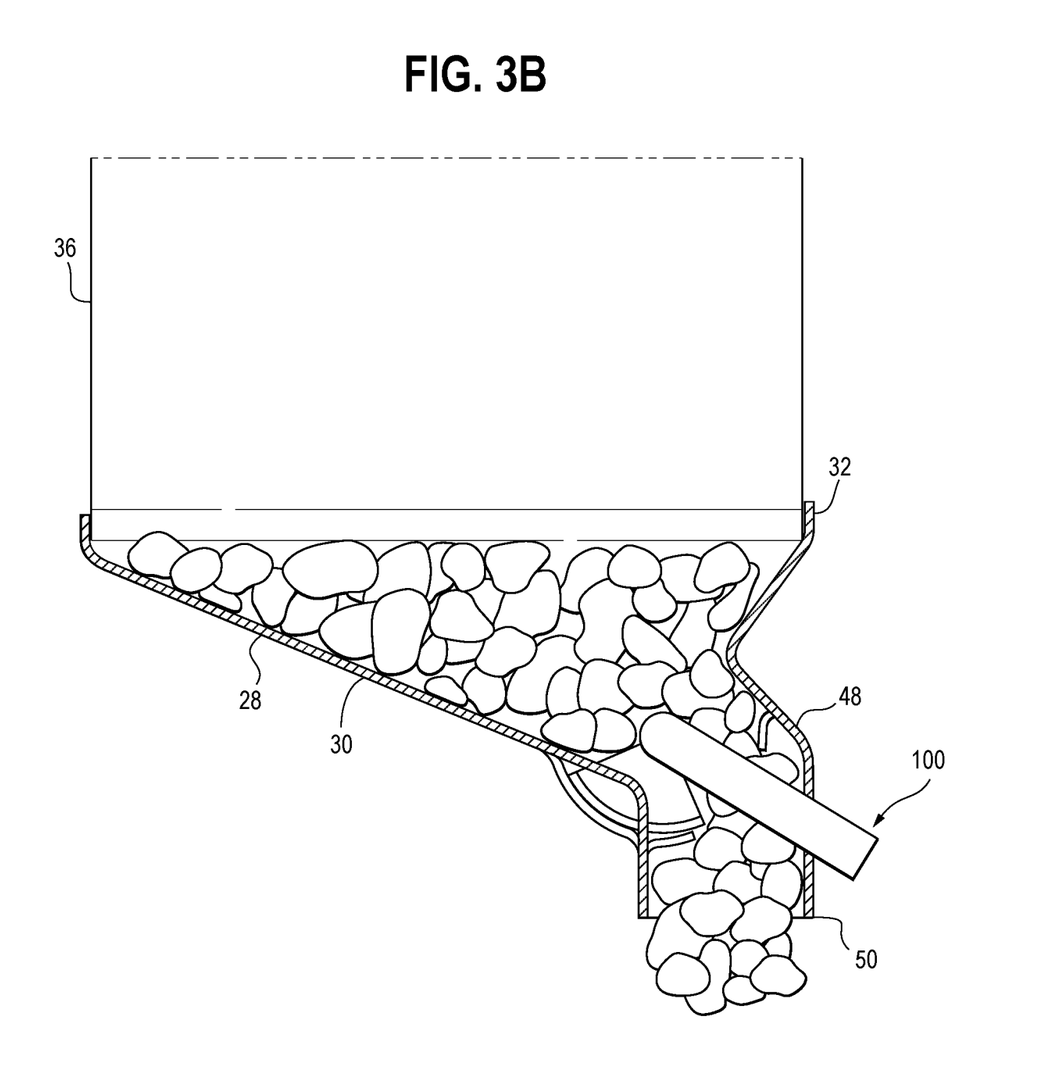
FIG. 3B shows the food dispensing apparatus of FIG. 3A with the gate open to illustrate the movement of food from the cavity of the housing toward the opening to be dispensed into a receiving receptacle (not shown).

Turning now to FIGS. 3A and 3B, a portion of another embodiment of a bulk food dispenser 20 is shown. In this embodiment, a generally pie-shaped interior gate 62 is provided with the rounded portion 68 being in contact with the first and second sealing members 54, 56 when the interior gate 62 is in the closed position.

As with the embodiment shown in FIGS. 2A and 2B, the gate actuator 100 is in the form of a u-shaped handle having two legs 102, 104 with each leg affixed to a respective side of the interior gate 62 adjacent the apex 70 of the interior gate 62.

Figure 4:
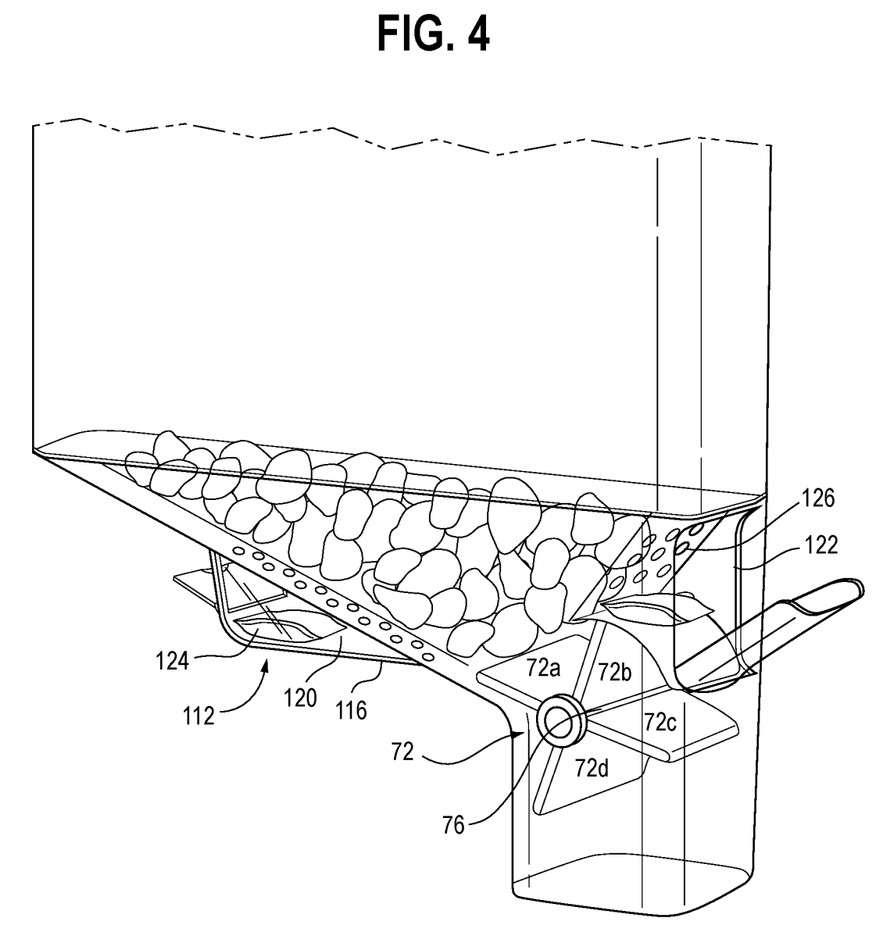
FIG. 4 shows another embodiment of a food dispensing apparatus with the gate in a closed position and with the environmental control apparatus in the form of a moisture mitigation apparatus.

Turning now to FIG. 4, the interior gate 62 may be configured as a paddle wheel shaped apparatus 72, with a central axis and at least three paddles extending radially outward from the central axis. As shown in FIG. 4, the paddle wheel apparatus 72 is provided with four paddles 74a, 74b, 74c, and 74d. In some instances, adjacent paddles will interact with the first and second sealing members 54, 56 to retain the product within the cavity 24. As appreciated by viewing FIG. 4, two adjacent paddles, e.g., 74a and 74b will define a substantially V-shaped receptacle 76 that may be appropriately sized to receive and define a "serving size" aliquot of the food product. Thus, as seen, adjacent paddles 74a and 74b cooperate with the first and second sealing members 54, 56, respectively, to retain product in the cavity 24. At the same time, a defined amount of product may be retained in the receptacle 76. As the paddle wheel 72 rotates, the food product retained in the receptacle 76 moves away from the proximal portion 48 of the opening 44 toward the distal portion 50 and thus, the outlet 52 so that when the receptacle 76 is exposed to the distal portion 50 of the opening 44, product retained in the receptacle 76 will fall, by gravity, through the outlet 52.

Moreover, it will be appreciated that by virtue of adjacent paddles being in contact with at least a portion of the walls of the opening or the sealing members 54, 56, if provided, the food product within the cavity 24 is prevented from egress from the cavity 24 through the opening 44. Advantageously, when the paddle wheel 72 has at least three paddles, it will be appreciated that egress of the food product from the cavity 24 directly through the opening 44 is prevented, which acts to prevent or minimize the ingress of air and moisture from outside the apparatus 20 into the cavity 24 through the outlet 52 and opening 44 even while the food product is being dispensed.

Figure 5:
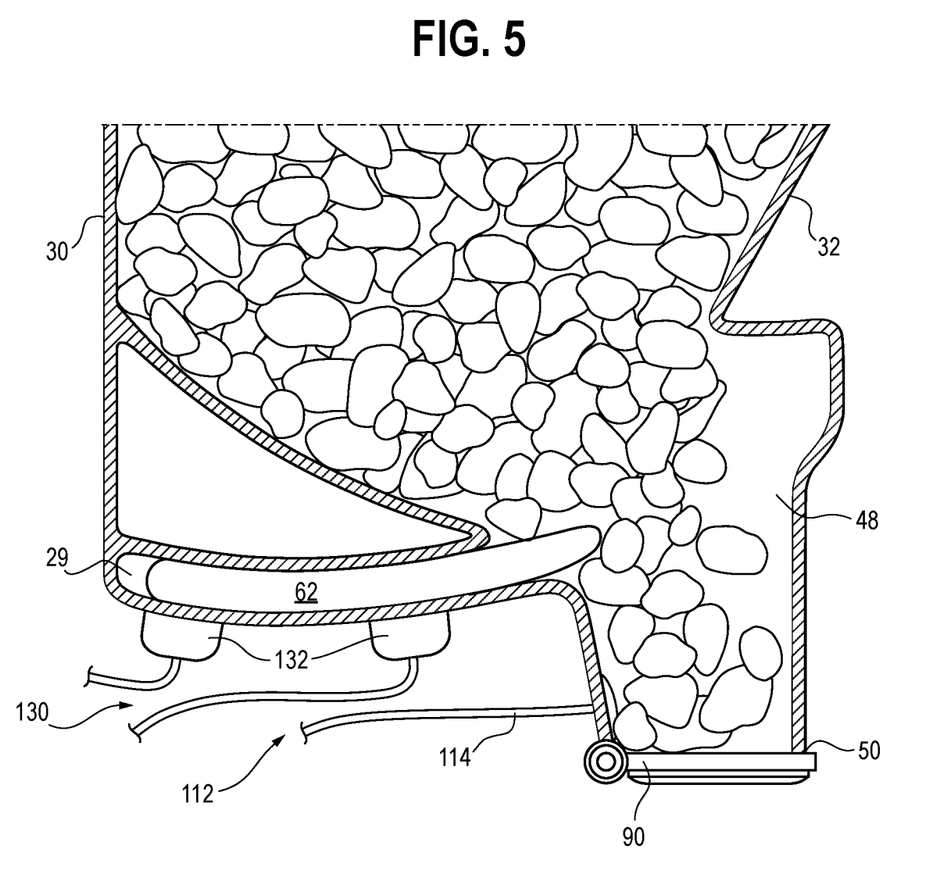
FIG. 5 shows another embodiment of a food dispensing apparatus with the gate in an open position and showing the movement of food from the cavity of the housing toward the opening to be dispensed into a receiving receptacle (not shown).
Figure 6:
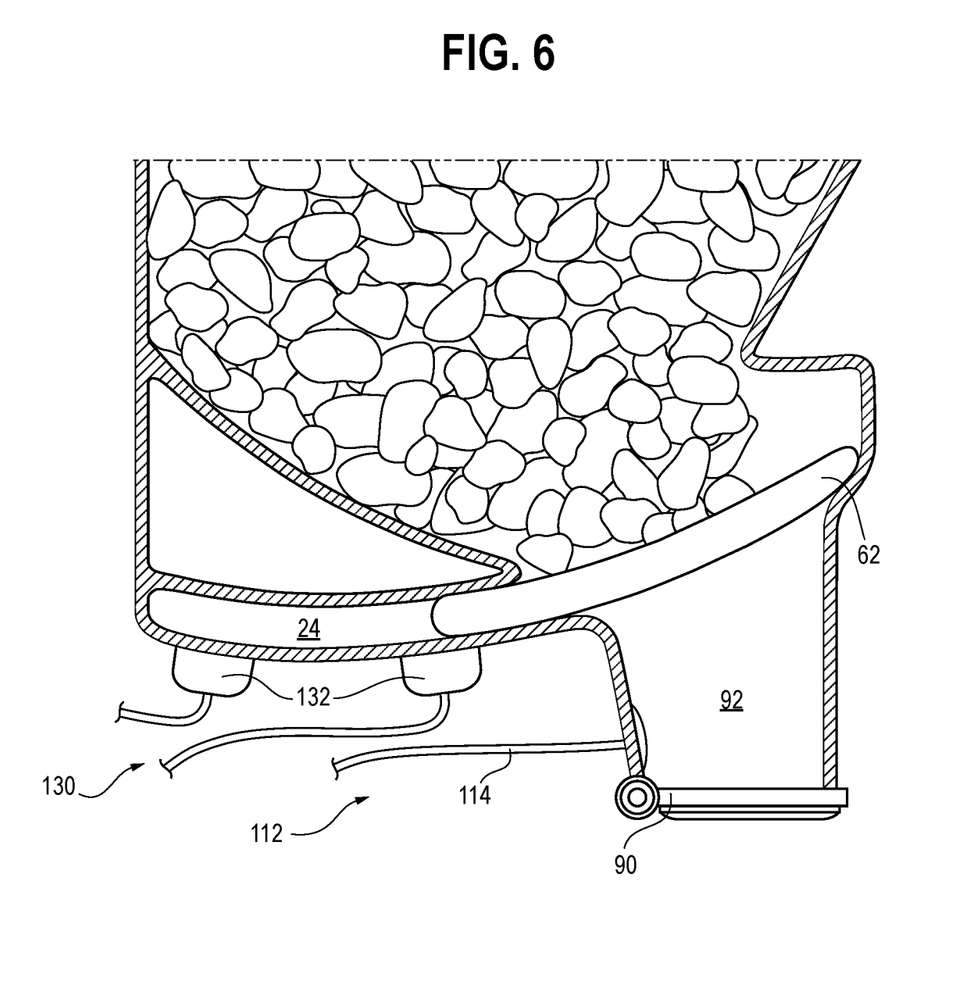
FIG. 6 shows the food dispensing apparatus of FIG. 5 with the gate in a closed position.

Turning now to FIGS. 5 and 6, another embodiment of a dispensing apparatus 20 is shown. In this, embodiment, both an interior gate 62 and an exterior gate 90 are provided. The interior gate 62 is provided at the proximal end 48 of the opening 44 and the exterior gate 90 is spaced from the interior gate 62 and adjacent the distal end 50 of the opening 44. The space between the interior gate 62 and the exterior gate 90 defines a holding chamber 92 in which an aliquot of food resides prior to being dispensed.

FIG. 5 shows the interior gate 62 in an open position where a substantial portion of the interior gate 62 is receded within a bottom cavity 29 provided in the bottom 28 of the housing 22. FIG. 5 shows the exterior gate 90 in a closed position while the interior gate 62 is an open position, it is contemplated that both gates may be open or both may be closed at the same time. That being said, since it is desirable to minimize ingress of air into the cavity 24 to minimize the potential for spoilage and contamination of food present in the cavity 24, generally the exterior gate 90 will be closed when the interior gate 62 is open and vice versa. In this way, the cavity 24 will be sealed or substantially sealed even during dispensing of food from the dispensing apparatus 20.

Generally, in operation, the exterior gate 90 is closed as shown in FIG. 5, and then the interior gate 62 is opened so that food from the cavity 24 moves from the proximal portion 48 of the opening 44 to the distal portion 52 of the opening 44 to fill the holding chamber 92. When the holding chamber 92 is filled, the interior gate 62 can be closed and the exterior gate 90 can be opened to dispense the food product to a receptacle.

FIG. 6 shows the interior gate 62 in a closed position where a distal portion of the interior gate 62 is in contact with an interior portion of the front wall of the opening to seal the opening and to prevent food product from exiting the cavity 24 into the opening. While not shown, it will be appreciated that the food shown in FIG. 5 that is present in the holding chamber 92 may be dispensed at any suitable time.

The interior gate 62 may be moved from an open position to a closed position or a position between the open position and closed position. Similarly, the exterior gate 90 may be moved from an open position to a closed position or a position between the open position and closed position. Operation of the interior gate 62, the exterior gate 90, or both may be controlled by a microcomputer and/or similar electro-mechanical device (not shown), which are well-known to those skilled in the art.

Turning back to FIG. 5 and as mentioned above, the dispensing apparatus 20 may further include an agitator 130 (one example of which is shown in FIG. 5) such that when the agitator 130 is activated it assists the food product to move from the cavity 24 toward the opening 44. In some instances, the agitator 130 may be in contact with the food product (directly or indirectly), one or more portions of the housing 22, one or more portions of the interior gate 62, or a combination. Generally, the agitator 130 will be activated when the interior gate 62 is moved to an open position and the agitator 130 will operate to assist the food product to move from the cavity toward the opening.

In the particular instance shown in FIG. 5, the agitator 130 includes at least one and, as shown, two micro-vibrator devices 132 located at the bottom 28 of the housing 22 adjacent the interior gate 62. When the micro-vibrator devices 132 are activated, they will vibrate causing a vibration to move to the interior gate 62, where at least a portion of the interior gate 62 is in contact with food product traveling from the cavity 24 toward the opening 44. It is believed that the vibration of the interior gate 62 will be transferred to food product in contact with and/or near the interior gate 62 so that the tendency of the food product falling by gravity toward the opening to agglomerate, bridge, or clump will be inhibited.

Turning to FIG. 6, both the interior gate 62 and the exterior gate 90 are in a closed position such that the holding chamber 92 is substantially sealed. It will also be seen that FIG. 6 shows an environmental control apparatus 112 that, in this instance, includes an oxygen displacement apparatus 114. The oxygen displacement apparatus 114 may include a vacuum operably connected to and in fluid communication with the dispensing apparatus 20 and, specifically in this instance the holding chamber 92, and is effective to remove all or substantially all of the air (oxygen) present in the apparatus. Alternatively or additionally, the oxygen displacement apparatus 114 may include a system for delivering an air (oxygen) displacement substance (typically an inert gas) to the dispensing apparatus 20 and, specifically in this instance the holding chamber 92, to displace the ambient air (containing oxygen) in the holding chamber 92, thereby inhibiting or reducing oxidation of the stored food product in the cavity 24.

It will be appreciated that, by providing the environmental control apparatus 112 shown in FIG. 6 in combination with the operation of the interior 62 and exterior gate 90 such that only one gate is open while the other gate is closed, ingress of ambient air into the cavity 24 should be substantially inhibited. To this end, in operation, the environmental control apparatus 112 shown in FIG. 6 may be activated when both the interior 62 and the exterior gates 90 are closed to displace ambient air present in the holding chamber 92. As a result, when the interior gate 62 is opened to allow food from the cavity 24 to move into the holding chamber 92, there is no or only a small amount of ambient air present to potentially contaminate the food in the cavity 24. When a desired amount of food product is present in the holding chamber 92, the interior gate 62 may be closed, thus, sealing the cavity 24 and the holding chamber 92. Thereafter, the exterior gate 90 may be opened so that the food product is dispensed into, for example, a consumer supplied receptacle. After the food product is dispensed, the exterior gate 90 may be closed and the environmental control apparatus 112 may be activated to displace the ambient air that entered the holding chamber 92 when the exterior gate 90 was opened.

Figure 7:
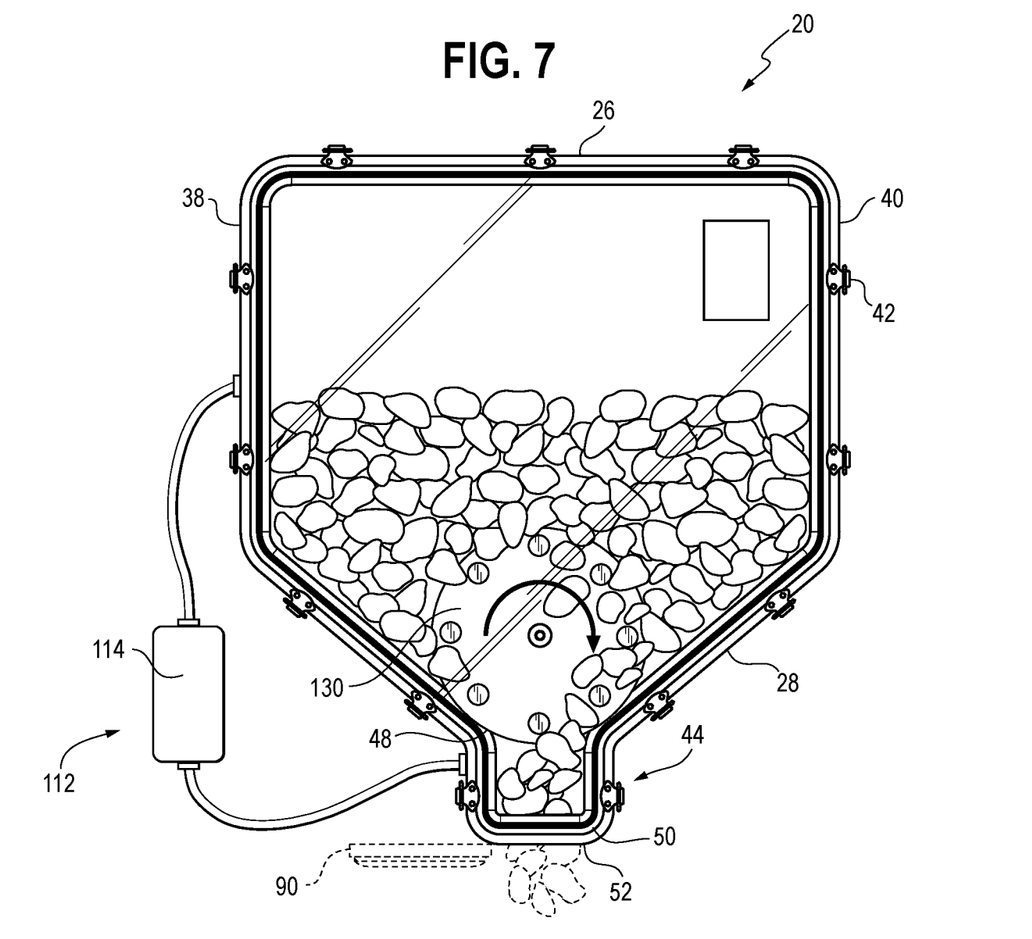
FIG. 7 shows another embodiment of a food dispensing apparatus with the gate in an open position and showing the movement of food from the cavity of the housing toward the opening to be dispensed into a receiving receptacle (not shown).
Figure 8:
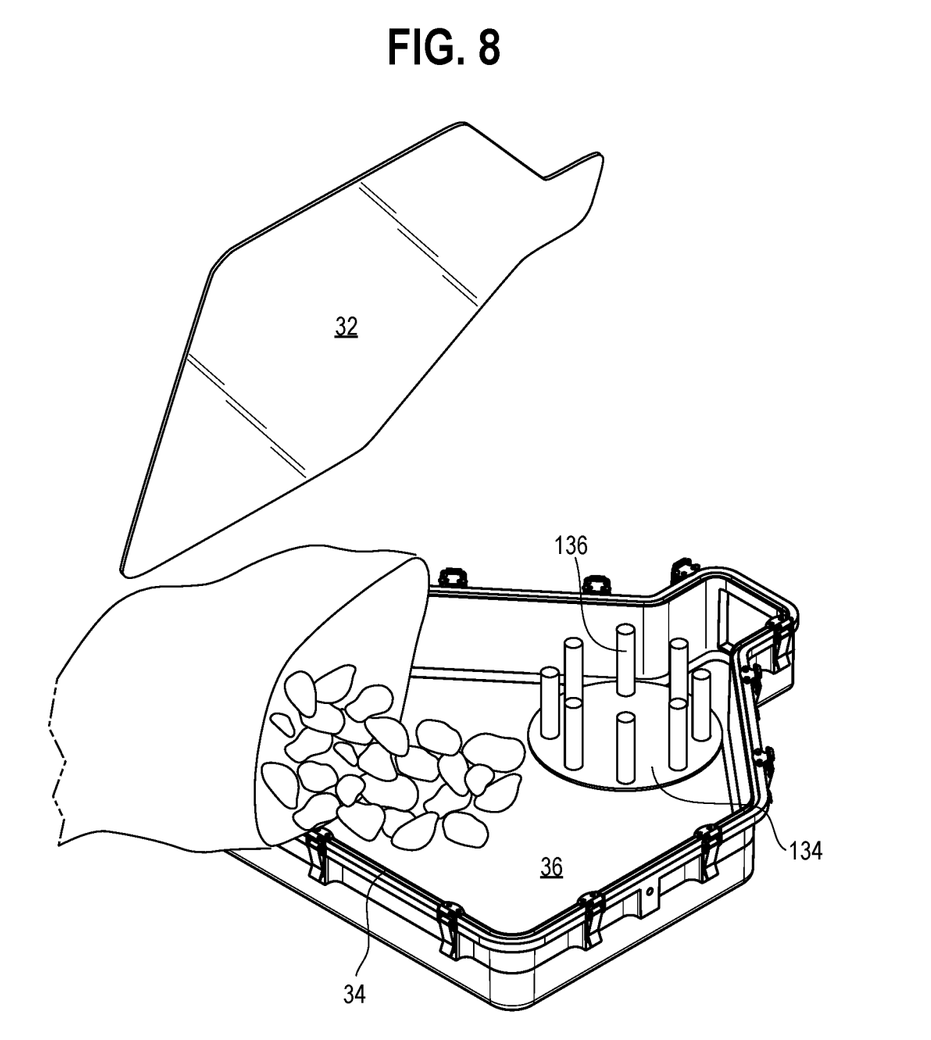
FIG. 8 shows the food dispensing apparatus of FIG. 7 with a portion of the housing (the front) removed to permit food product to be loaded into the housing.

Turning now to FIGS. 7 and 8, another embodiment of the dispensing apparatus 22 is shown. In this embodiment, there is no interior gate 62. Rather, there is an exterior gate 90 at the distal end 50 of the opening 44. The exterior gate 90 may be moved from an open position (shown in dashed lines) to a closed position or to a position between open and closed. Movement of the exterior gate 90 may be achieved in any suitable manner such as by control through a microcontroller issuing commands to an electro-mechanical apparatus (not shown), both of which are well-known to those skilled in the art.

As seen in FIGS. 7 and 8, an agitator 130 in the form of a rotating wheel 134 rotatably attached to the rear 36 of the dispensing apparatus 22 and having pins 136 that extend outward from the rotating wheel 134 toward the front 32 of the dispensing apparatus 22. Rotation of the wheel 134 may be achieved in any suitable manner such as by control through a microcontroller issuing commands to an electro-mechanical apparatus (not shown), both of which are well-known to those skilled in the art. In operation, when the exterior gate 90 is moved toward an open position, the rotating wheel 134 will be activated so that it rotates, causing the pins 136 to contact and move food product and thus, inhibit clumping, bridging, or agglomeration of the food product as it moves toward the opening 44.

It will also be seen that the dispensing apparatus 22 shown in FIGS. 7 and 8 includes an environmental control apparatus 112 that, in this instance, includes an oxygen and moisture displacement apparatus 114. The oxygen and moisture displacement apparatus 114 may include a vacuum operably connected to the dispensing apparatus and, specifically in this instance to the cavity and the opening, and is effective to remove all or substantially all of the air (oxygen) and moisture present in the apparatus. Alternatively or additionally, the oxygen displacement apparatus 114 may include a system for delivering an air (oxygen) displacement substance (typically an inert gas) to the dispensing apparatus and, specifically in this instance to the cavity and the opening, to displace the ambient air (containing oxygen) and moisture in the cavity and opening, thereby reducing the potential for oxidation of the stored food product. In operation, the environmental control apparatus 112 may be activated when the exterior gate 90 is in a closed position.

As shown in FIG. 7, the dispensing apparatus 22 includes an environmental sensing and control unit 110. It will be appreciated that environmental sensing and control unit 110 shown in FIG. 7, may be present in any of the other disclosed dispensing apparatuses 22. The environmental sensing and control unit 110 may measure one or more of the temperature, moisture, and oxygen content within the apparatus including the cavity and opening. With regard to the temperature, upon sensing, the environmental sensing and control unit 110 may control a heat modulator to either input heat into the dispensing apparatus or to remove heat from the dispensing apparatus in order to maintain the temperature within a suitable range such as from about 15° C. to about 30° C.

In a similar manner, the environmental sensing and control unit 110 may measure the moisture content within the dispensing apparatus and, upon sensing, may control a moisture modulator (e.g., the oxygen displacement apparatus) to remove moisture from the dispensing apparatus 22 to maintain the moisture content within the dispensing level below about 5%, about 4%, about 3%, about 2%, or about 1% or in a range from about 1% to about 5%, or about 1% to about 4%, or about 1% to about 3%, or about 1% to about 2%.

Alternatively, the environmental sensing and control unit 110 may be associated with an alert. The alert may be in the form of an alert signal provided on a control panel associated with the dispensing apparatus 20 and/or dispensing module 10. It is also contemplated that the alert may be in the form of an alert signal provided to a computer control system associated with the dispensing apparatus 20 and/or dispensing module 10, which may be configured to send an appropriate signal to a mobile device associated with the computer control system.

Similarly, the environmental sensing and control unit 110 may measure the oxygen content in the dispensing apparatus 22 and, upon sensing, may control the environmental control apparatus 112. Control of the environmental control apparatus 112 may include activating the environmental control apparatus 112, which in this instance includes an oxygen displacement apparatus 114, to displace air from the dispensing apparatus as described above.

Referring to FIG. 8, it will be appreciated that the front 32 of the housing 22 is removable and may be removably secured in position with latches 42 or other devices. In some embodiments, an inner peripheral edge 34 of the front may be provided with a gasket or gasket-like material to provide a more effective seal from the outer environment, which will help to maintain the freshness of the food product in the cavity of the dispensing apparatus. Of course, it is understood that where a portion of the housing 22 other than the front 32 is removably secured, a similar inner peripheral edge may be provided.

Figure 9:
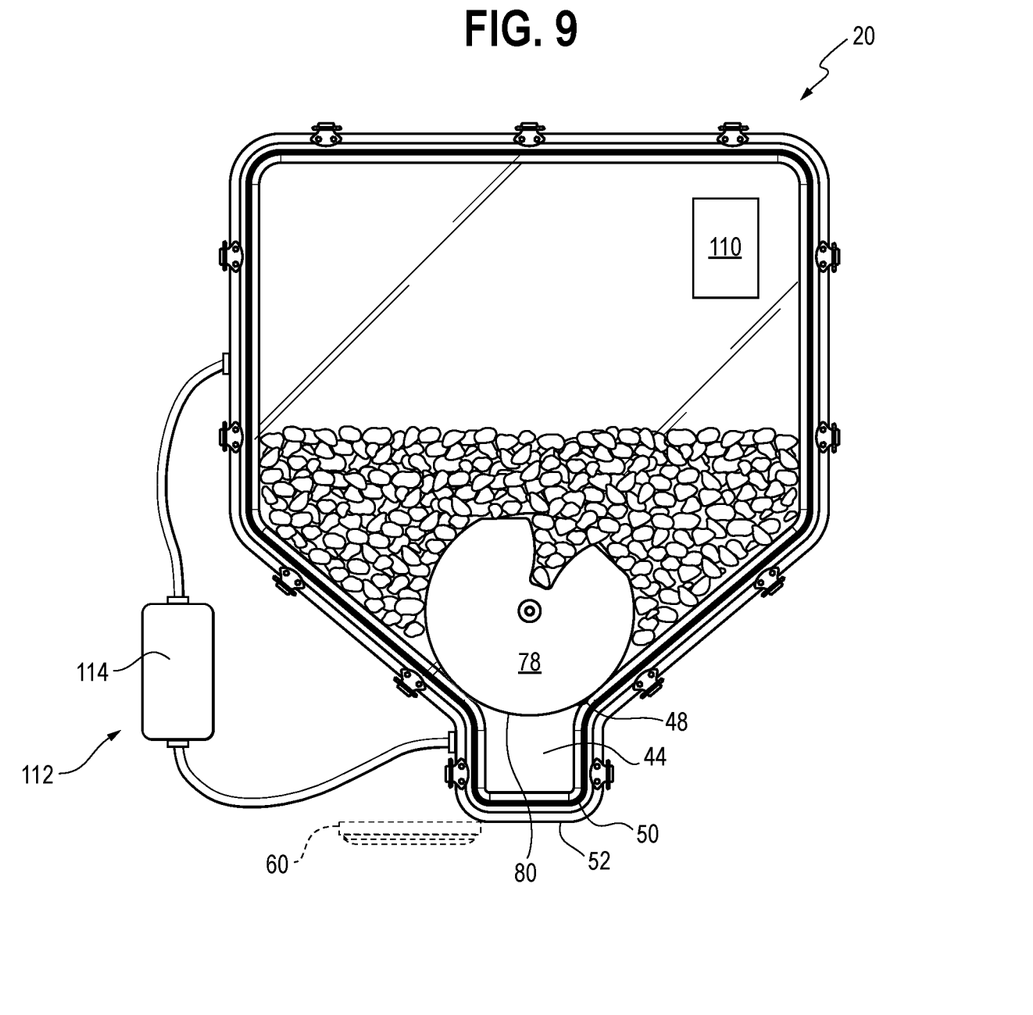
FIG. 9 shows another embodiment of a food dispensing apparatus with the gate in a closed position and with an environmental control apparatus that includes a displacement apparatus in the form of a vacuum to remove air from the dispensing apparatus.
Figure 10:
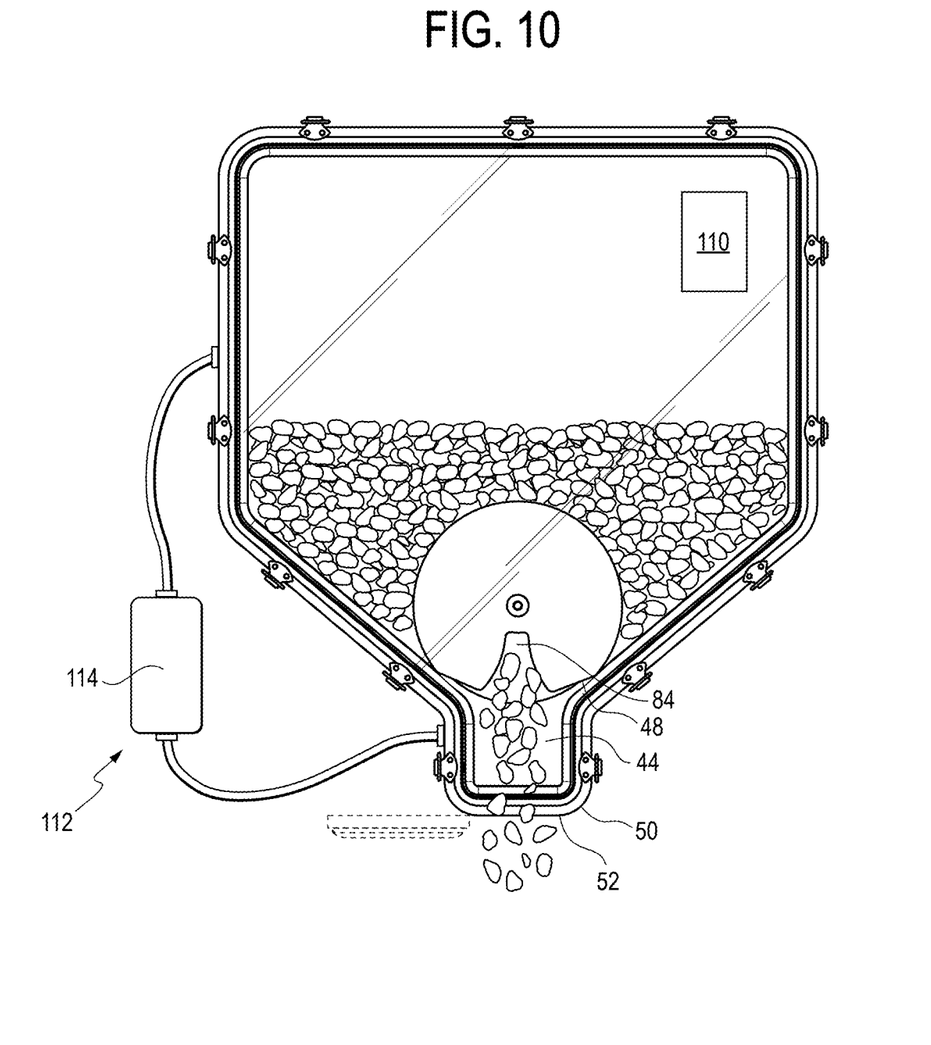
FIG. 10 shows the food dispensing apparatus of FIG. 9 with the gate in an open position showing the movement of food from the cavity of the housing toward the opening to be dispensed into a receiving receptacle (not shown).

Turning now to FIGS. 9 and 10, in this embodiment of the dispensing apparatus 22, the gate 60 is configured as a circular wheel 78 having a cut-out portion extending from the periphery of the wheel toward the center of the wheel to define a reservoir 84 that is sized to receive a selected amount of food product. The periphery 80 of the wheel 78 is adjacent and, in some instances abuts the proximal portion 48 of the opening 44 or first and second sealing members 54, 56 when present, so that when the cut-out is not facing the opening 44, the opening 44 is sealed and product within the cavity 24 is not able to pass from the cavity 24 to opening 44. As the wheel 78 is rotated and the reservoir 84 is in a selected position facing the opening 44, as best seen in FIG. 10, the food product will fall by gravity toward the outlet 52. In this positon, as noted, the opening of the reservoir 84 is opposite to, i.e., faces, the opening 44 to allow food product within the reservoir 84 to fall by gravity to the outlet 52, while still blocking food in the cavity 24 from moving to the opening 44. Advantageously, while the food product is being dispensed, the outer periphery 80 of the wheel 78 will be in contact with the proximal portion 48 of the opening 44 and/or first and second sealing members 54, 56 so that ingress of air and moisture from outside the dispensing apparatus 22 into the cavity 24 through the outlet 52 and opening 44 is prevented or minimized.

Like the dispensing apparatus 22 shown in FIGS. 7 and 8, the dispensing apparatus 22 of FIGS. 9 and 10 is also shown with an environmental control sensing and control unit 110 and an environmental control apparatus 112, which may operate in the manner as described above.

The dispensing apparatus 22 may be provided with a product selector interface (not shown) that may include one or more buttons, indicators, touch screen interfaces, and the like, to be touched, pushed, virtually or contactlessly operated, or otherwise operated to initiate actuation of one or more of the interior gate, the exterior gate, the agitator, the environmental control apparatus or any combination of them. For example, it is contemplated that the product selector interface may be configured to move the interior gate 62 or the exterior gate 90 or both from the first position to the second position (or to any position between the first and second position) for a selected period of time so that a selected quantity of product is delivered through the outlet 52. The product selector interface may be associated with a microprocessor that, in turn, is associated with and controls one or more electro-mechanical operators configured to move the gate 60 from the first position to the second position (or to any position between the first and second position) for a selected period of time.

While the dispensing apparatus 22 has been described in connection with several illustrated embodiments, the skilled artisan will appreciate that certain features described in connection with one embodiment may also be included in other described embodiments. Thus for example, the environmental control sensing and control unit 110, the an environmental control apparatus 112, and the agitator 130 shown and described in FIGS. 5-8 may be present in other described embodiments such as, but not limited to, the dispensing apparatus 22 shown in FIGS. 2A and 2B.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A dispenser for stored product comprising:
a generally hollow housing having a cavity configured to retain product;
an outlet provided at a lower portion of the housing with a proximal portion adjacent the cavity and a distal portion spaced from the proximal portion;
a gate disposed between the cavity and the distal portion or disposed at the distal portion;
an actuator coupled to the gate to selectively position the gate between a closed position and an open position, wherein in the closed position product disposed within the cavity cannot move to the outlet and in the open position product falls by gravity from the cavity to the outlet;
an environmental control unit to control an environmental control apparatus to modulate temperature or oxygen content within the dispenser;
a moisture displacement apparatus that comprises a chamber adjacent the cavity, in fluid communication with the cavity, and configured to retain an inert substance adapted to absorb moisture in the housing.

2. The dispenser of claim 1 further comprising a biasing element to bias the gate in a closed position.

3. The dispenser of claim 1 wherein the environmental control apparatus includes an oxygen displacement apparatus.

4. The dispenser of claim 3 wherein the oxygen displacement apparatus comprises (a) a vacuum operably connected to the dispenser apparatus and effective to remove all or substantially all of the air (oxygen) present in the dispenser, (b) a system for delivering an inert gas to the dispenser apparatus, or both (a) and (b).

5. The dispenser of claim 1 further comprising an agitator in contact with the product or associated with the gate such that when the gate is in an open position and the agitator is activated, movement of the product from the cavity to the outlet is assisted.

6. The dispenser of claim 5 wherein the agitator includes a wheel rotatably attached to a rear of the housing within the cavity and having a plurality of pins extending from the wheel toward a front of the assembly, the wheel being positioned adjacent the proximal portion of the outlet.

7. The dispenser of claim 6 wherein the agitator includes at least one micro-vibrator positioned on an external portion of the housing adjacent the gate such that activation of the micro-vibrator transmits vibrations to the gate and to product in contact with the gate to assist movement of the product from the cavity to the outlet.

\* \* \* \* \*